Nov. 1, 1966  A. W. THIEL  3,283,045

PROCESS FOR THE PRODUCTION OF THIN-WALLED PLASTIC ARTICLES

Original Filed Aug. 24, 1960  11 Sheets-Sheet 1

INVENTOR
ALFONS WILHELM THIEL

BY
Norris & Bateman

Nov. 1, 1966  A. W. THIEL  3,283,045
PROCESS FOR THE PRODUCTION OF THIN-WALLED PLASTIC ARTICLES
Original Filed Aug. 24, 1960  11 Sheets-Sheet 2

INVENTOR
ALFONS WILHELM THIEL
BY Norris & Bateman

Nov. 1, 1966     A. W. THIEL     3,283,045
PROCESS FOR THE PRODUCTION OF THIN-WALLED PLASTIC ARTICLES
Original Filed Aug. 24, 1960     11 Sheets-Sheet 4

INVENTOR
ALFONS WILHELM THIEL
BY Norris & Bateman

Fig. 7

INVENTOR
ALFONS WILHELM THIEL

United States Patent Office 3,283,045
Patented Nov. 1, 1966

3,283,045
PROCESS FOR THE PRODUCTION OF THIN-WALLED PLASTIC ARTICLES
Alfons Wilhelm Thiel, Kaiserstr. 63, Mainz, Germany
Original application Aug. 24, 1960, Ser. No. 51,669, now Patent No. 3,161,915, dated Dec. 21, 1964. Divided and this application Oct. 1, 1964, Ser. No. 400,642
Claims priority, application Germany, Nov. 8, 1957, T 14,382, T 14,383, T 14,384; Aug. 31, 1959, T 17,146; Nov. 3, 1959, T 17,421
13 Claims. (Cl. 264—89)

This application is a divisional application from applicant's copending parent application Serial No. 51,669, filed August 24, 1960, now patent No. 3,161,915, which latter application is a continuation-in-part of applicant's parent application Serial No. 771,864, filed November 4, 1958, and issued December 31, 1963, as United States Patent No. 3,115,677.

The invention relates to processes for the production of thin-walled plastic articles and particularly those having a beaded edge, more particularly in the form of an edge bead of substantially circular cross-section, by deep-drawing thermoplastic or like material in foil or strip form.

In that parent application there is disclosed an overall apparatus and process wherein a series of operations comprising preheating, shaping, cooling and punching the pieces from a strip or band of plastic material is carried out as each length of the strip is moved stepwise through the apparatus. In that process and apparatus the thermoplastic strip is fed into one end of the apparatus, and the finished workpieces are continuously collected and extracted at the other end.

The parent application more specifically discloses an apparatus wherein there is arranged in succession a strip preheating station, a shaping station, a cooling path, a punching out station, and a device for collecting and forwarding the punched out shaped workpieces. In the shaping station a shaping tool adapted for deep drawing deformation work is displaceable vertically with respect to the preheated strip being formed, and it acts to deep draw and shape the band so that the shaped pieces are formed integrally in the thermoplastic strip. The present invention includes other embodiments and improvements in this direction.

After shaping the band with the shaped workpieces therein is drawn through a special cooling path which is of a length approximately equal to one feed step through the shaping station, but the cooling path may be shorter by about 0.5% to 1.0%. This cooling path is of adjustable length.

In the present invention the preheating station apparatus, the subsequence shaping station apparatus, the cooling station, and the associated process steps acting on the thermoplastic strip, are preferably exactly as disclosed in said Serial No. 771,864 for many aspects of the present invention, and the invention herein is directed mainly to the process according to said application and certain variations thereof herein disclosed in detail whereby to specially shape and punch out the shaped workpieces from the strip with externally peripherally curved rims thereon.

In the present invention special shaping process steps will be described for the automatic and accurate forming of workpieces wherein the rims are externally and reversely curved, or beaded over, as well as associated punching and carry away arrangements.

The present invention also includes a novel association of the shaping, punching and conveying apparatus for high speed continuous automatic production and collection of articles formed from relatively thin sheets of material which becomes deformable when heated.

To form beaded-over edges in thick-walled cylindrical workpieces made of a thermoplastic material, such edges being of circular cross-section, it is already known to introduce the cylindrical parts by their terminal edges into a heated shaping tool which uses the lengthwise pressure applied to the workpiece to bead over the terminal edge thereof. This step can be used on thick-walled cylindrical articles but it is of no use for articles of any other shape, because lengthwise pressure applied to the article would rather tend to compress the same than to bead the edge thereof.

To enable workpieces of any shape and of reduced wall thickness to be given a beaded edge of clean appearance and circular cross-section, the invention proposes process where that edge of the workpiece which it is required to bend is as far as possible prepared and bent while the workpiece is being shaped and remains integral with the strip, and is cut to size in preparation for being beaded over when the workpiece is cut out of the said strip, and the prepared and bent-over part of the edge is placed on a thrust surface as abutment for beading over the still untreated but cut-to-shape part of the edge.

The invention prevents any force being applied to the workpiece while the edge is being beaded over. The beading step can therefore be carried out on workpieces of any shape rapidly and without any risk of damage. The process according to the invention can readily be included in a continuous production process and can be performed, using simple technical means, by staff who do not have to be given any special training.

The actual beading-over step can be performed in any way compatible with the material of which the workpiece is made. Very advantageously, the still untreated but cut-to-shape part of the edge may be beaded over by stamping step with heating. According to one very advantageous embodiment of the invention, the preparation and beading-over of the workpiece edge is preformed during the shaping of the workpiece in a vacuum deep drawing step in which a shaping tool descends upon a heated strip of material, the same sagging after the fashion of a sack. Conveniently, when extenders are used, an air cushion is formed, during workpiece shaping, between the heated sagging strip of plastic and the shaping tool, and the extenders, together with the work-piece forming parts of said plastic strip, are advanced into such air cushion and into the mould cavities only to such an extent that the plastic strip remains out of engagement with those parts of the shaping tool which prepare and bend the edge parts of the workpiece. Advantageously, while the workpiece is being shaped, those regions of the strip of material which will subsequently form the edge parts of the workpiece are pressed against the bottom surface of the shaping tool, for instance, by compressed air.

The process according to the invention does not complicate the production of the workpieces at all.

It is a major object of the invention to provide a novel process for the production of thin-walled hollow thermoplastic articles having a beaded rim of rounded contour which process comprises the steps of first shaping each of said articles from a sheet of thermoplastic material such that each has a substantially unbeated and outwardly flared skirt at its rim portion, then cutting each article out of said sheet, and finally finishing each article by forming the rim portion thereof with a beaded or rounded cup rim.

A further major object of the invention is to provide a novel process for finishing the rim portion of thermoplastic-articles to provide a beaded rim portion of rounded contour.

Still another major object of the invention is to provide a novel process for shaping a thin-walled hollow thermoplastic article in order to enable or at least to improve production of a beaded rim of rounded contour on the article after the shaping process. The bead forming finishing steps may be performed immediately following to the shaping process or they may be done after sometime of storing or transport of the shaped articles in unfinished condition.

An important object of the invention is to provide a novel process for shaping articles in a preheated length of plastic material, punching the articles out of the strip and forming beaded peripheral edge rims on the articles.

It is a further major object of the present invention to provide a novel process for the production of groups of articles, such as cups, from thin-walled plastic material wherein the articles are automatically shaped with definite preliminary rim structure in a preheated length of sheet plastic material.

A further related object of the invention is to provide a novel process for cutting the shaped articles from the material.

A further object of the invention is to provide a novel process wherein groups of articles are shaped in and punched out of a length of thin heated plastic sheet matterial followed by another shaping operation to attain a definite rim formation.

A further object of the invention is to provide a novel process for shaping articles in a length of thin plastic material wherein the material heated to sagging condition is mechanically and subsequently by vacuum deformed in special apparatus.

Further objects will appear as the description proceeds in connection with the appended claims and the annexed drawings wherein:

Figure 3A:
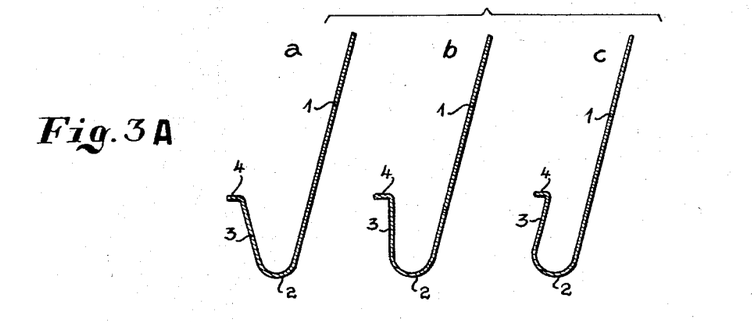
FIGURES 3A, 3B and 3C diagrammatically illustrates how the workpieces are evolved in some forms of the process according to the invention.
Figure 3B:
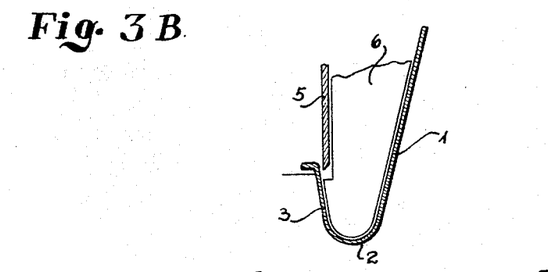
Figure 3C:
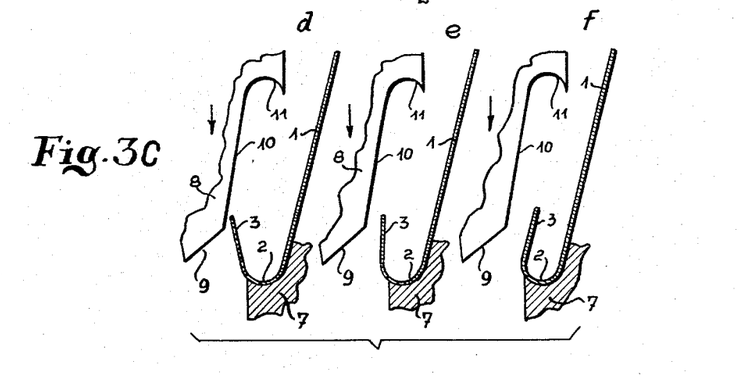

The invention herein is particularly applicable for producing cups and other cup-shaped articles. Briefly, the process to be described in detail herein comprises the steps of shaping the cups from a sheet of plastic material at a first station so as to form each cup with a rim portion 3 (FIGURE 3) prior to a cutting or punching operation. After the cups are formed in this manner in the plastic sheet, they are punched out at a second station to separate the cups from the plastic sheet and to remove untreated, superfluous edge portions. Following this punching and cutting operation, the cup rim portion 3 is curled at a third station to so bend rim portion 3 as to form a final beaded or rounded cup contour.

Figures 1, 2:
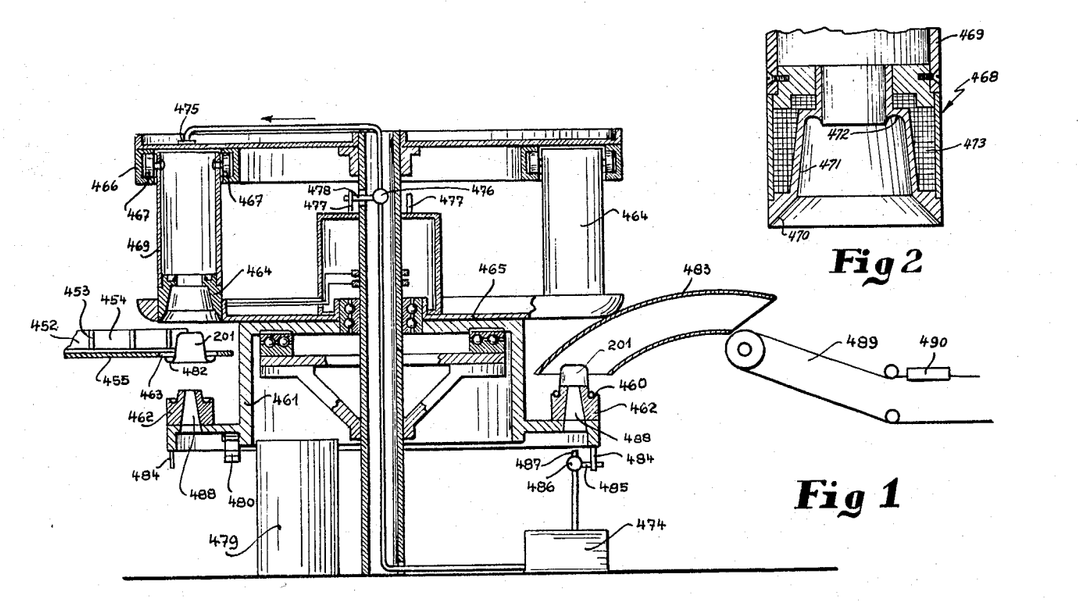
FIGURE 1 is a diagrammatic elevation in vertical section of one form of punching or stamping apparatus for carrying out the process according to this invention.
FIGURE 2 is a sectional elevation of a detail of FIGURE 1.

As shown in FIGURES 1 and 2, a plurality of partially shaped articles or workpieces 201 are conveyed to a special treatment station and then to a shaping station to provide workpiece 201 with rounded end portions 460. Said treatment station comprises a rotating disc 461 carrying form sockets 462 onto which the punched out workpieces are fed by a feed disc 452 through an opening 463 in a guide plate 455. Disc 452 is mounted on plate 455 and is continuously rotated by a motor (not shown). An additional heated shaping member 464 is provided for each form socket 462 and is mounted for the same rotational movement as its form socket 462 but at the same time for upward movement with respect to the form socket 462. Therefore a guiding disc 465 is fixed to the carrier disc 461. The upward and downward movement of tool 464 is controlled by stationary guiding rails 466 within which guiding rollers 467 of the forming elements 464 are running.

The additional forming tools are shown in FIGURE 2 consist of a tool head comprising at its inner surface a conical entrance zone 470, a slightly conical directing zone 471 and a rounded forming zone 472. The tool head 468 is further provided with electrical heating means 473.

In the additional treatment station further pressure air means 474–468 are used to press the workpiece 201 onto its form socket 462 during the feeding action and to discharge the workpiece from said station. In operation, the workpieces 201 fall one after the other through the opening 463 of guide plate 455. Disc 452 is formed with teeth 453 and rounded surfaces 454 extending between teeth 453 and corresponding to the shape of the workpieces to provide spaces for receiving the workpieces which are advanced by rotation of disc 452 toward opening 463. At the same time pressure air valve 476 is opened by an actuating nose 477 which is attached to each form socket 462 and which cooperates with an actuating rod 478 of valve 476. Pressurized air is blown through nozzle 475 from above onto the workpiece 201 to press it onto its socket 462. As soon as nose 477 leaves rod 478 during the rotation of discs 461 and 465 driven by driving means 479 through a driving pinion 480 and a gear ring 481, valve 476 closes. During the further rotation of the said discs 461 and 465 tool 464 is lowered by the guiding rails 466. Thereby the conical zone 470 of the inner tool surface comes in contact with the outer edge of the rim 482 of the workpiece 201 and during continued lowering down of the tool 464 the said rim 482 is introduced in the slightly conical zone 471 of the inner tool surface. Thereby said rim is bent in vertical direction and is introduced into the rounded zone 472 to become entirely rounded. The rim of the workpiece 201 is reversely curved externally thereof. After this forming action the tool 464 is lifted again during its circular path by the guiding rails 466, but the workpiece remains on its form socket and comes in its circular path in subjacent position to be a discharge tube 483. At the same time a second actuating nose 484 each one of which is attached to each form socket 462, comes in contact with the actuating rod 485 of a second air valve 486. A compressed air jet is blown by nozzle 487 through a bore 488 into the hollow part of the workpiece 201, said workpiece 201 being blown thereby through the discharge conveyor belt 489.

Counting means 490 may be used at said discharge conveyor belt 489 as well as collecting means 491 for the workpieces 201. Said collecting means may comprise deflecting plates 491 and a discharge door 492 which is controlled by the counting means 490 in order to collect a desired number of workpieces 201, for example fifty pieces, and to introduce them into a container 493.

Figure 9:
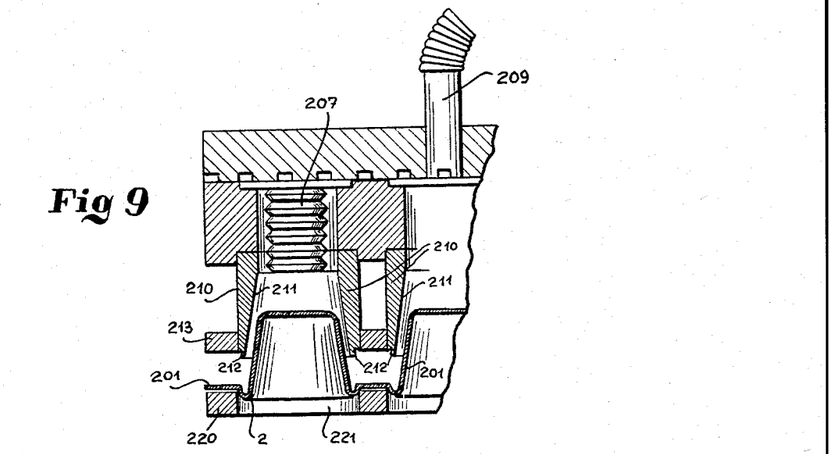

Referring to FIGURE 9, group A, the shaping of the workpiece starts by the preparation of an edge part 2 which immediately follows a wall 1 of the workpiece, and an untreated edge part 3 is provided which immediately follows the edge part 2. The part 3 is immediately followed by the material of a plastic strip 4 from which the workpiece 1 is produced. As is clearly apparent in views a, b and c, the edge part 2 should be prepared and bent as far as possible. The extent to which this should be done depends upon prevailing conditions, for instance, the nature of the material, the shape of the workpiece 1 and so. Without being intended to limit the extent to which the untreated edge part 3 can be bent inwards, group A of FIGURE 9 illustrates three cases which are possible with the process according to the invention. Referring to case a, the untreated edge part 3 still projects outwards from the workpiece. In the process according to the invention the part 3 can readily extend even more outwards. Case b is the critical case in which the untreated edge part 3 extends vertically. Finally, in case c the untreated edge part 3 inclines towards the workpiece. In the embodiment illustrated the untreated edge part 3 extends substantially parallel with the conical workpiece wall 1. The extent to which the edge part 3 can incline inwards is limited by the resilient deformability of the shaped material, i.e., the inward inclination of the part 3 can be effected to such an extent as the resilient deformability of the material makes it possible to remove the workpiece from the mould readily.

The punching-out and cutting-to-shape step is diagrammatically illustrated in FIGURE 9B. As can be seen, the cut-to-shape part is with advantage so placed that the transition between the strip of material and the untreated edge part 3 is severed with the waste. In case a of group A such a cut can readily be performed. In cases b and c, an aligning arrangement 6 associated with a knife 5 can place the untreated edge part 3 so far outwards, because of its resilient deformability, that the knife 5 can reliably cut the edge part 3 to the required size.

Finally, group C illustrates the rim shaping operation according to the invention device. The prepared or preshaped edge part 2 is guided accurately on a trestle 7, while a descending mould 8 is first being exactly centered, by means of the entry zone 9 of its operative surface, in relation to the cut-to-shape untreated edge part 3, whereafter the guiding zone of the mould operative surface engages with the terminal edge of the part 3 and presses the same increasingly inwards. Those parts of the untreated edge part 3 which are engaged by the said guiding zone are already heated so that there is no possibility of any creasing. The untreated edge part 3 is therefore introduced reliably into the shaping zone 11 of the operative surface, so that the untreated edge part 3 is shaped cleanly. As as comparison between the three illustrations d, e and f will show, the only result of increasing the amount by which the untreated edge part 3 is bent over is that the same engages later with the guiding zone 10 of the moulding tool 8. In any case, the result of introducing the untreated part 3 into the moulding tool accurately and cleanly is that the edge of the finished workpiece has exactly the shape for which the tool 8 is designed.

Consequently, to carry out the process according to the invention workpieces must be produced which have a preshaped edge part 2 following the workpiece wall 1, and an unbeaded and outwardly flared skirt 3 following the preshaped edge part 2. Accordingly, in the shaping device diagrammatically illustrated in FIGURE 4 a shaping tool 122 is provided which is adapted to descend on a heated plastic strip 121, the same sagging at 128 after the fashion of a sack. The shaping tool is mainly a negative mould with mould cavities 123. The same communicate through ducts 124 with a chamber 125 connected to an evacuating device. At the bottom edge of the mould cavities 123 ring-like mould parts 126 (FIGURE 5) are provided which project beyond the bottom surface of the shaping tool 122. In the embodiment illustrated, the surface parts of the underside of the tool 122 which lie between the annular arcuate in cross section projections 126 communicate through ducts 127 with the chamber 125 in order that, when the articles are being shaped, the heated strip material may be engaged by the external air pressure with the bottom of the shaping tool 122 near the projections 126 and in order that the annular arcuate in cross section projections 126 may be simulated in the shaped strip.

Figure 4:
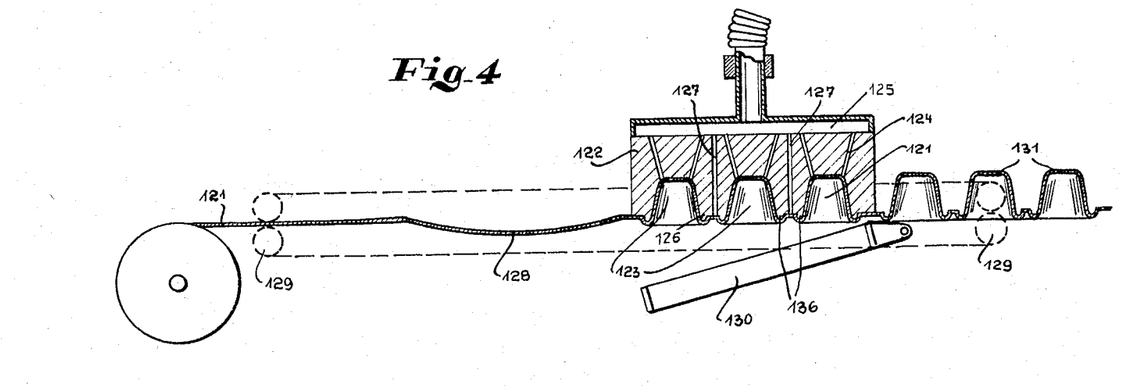
FIGURE 4 is a sectional elevation of an article shaping device.

Shaping proceeds as follows: the material strip 121, before entering the region below the shaping tool 122, is so heated that it sags after the fashion of a sack as shown at 128 and over a length corresponding to shaping tool length. Such length also corresponds to one feeding step of a conveyor 129. After such a feeding step has been performed, the shaping tool 122 is lowered until it engages with the edge parts of the sagging part 128 of the strip and, due to its downward movement, forms an air cushion between the sagging strip 121 and the mould cavities 123. Simultaneously, a rectangular clamping frame 130 is pivoted upwards to provide an air-tight closure and clamping between the edge of the tool 122 and the edge parts of the strip part 128 which is to be shaped. To provide additional elongation and pressing of the strip, the air cushion can be increased by an excess pressure or a negative pressure being produced one or more times in the chamber 125. For shaping, the chamber 125 is evacuated and, as can be seen in FIGURE 4, the plastic material of the strip 121 deforms and is closely applied to the surface of the cavities 123, to the projections 126 and to the flat parts between the projections 126. The plastic material cools immediately it contacts the shaping tool and, as it cools, sets. The tool 122 is then raised and workpieces 131 integrally preshaped in the strip 121 results, as can be seen on the right-hand side of FIGURE 10.

Figure 5:
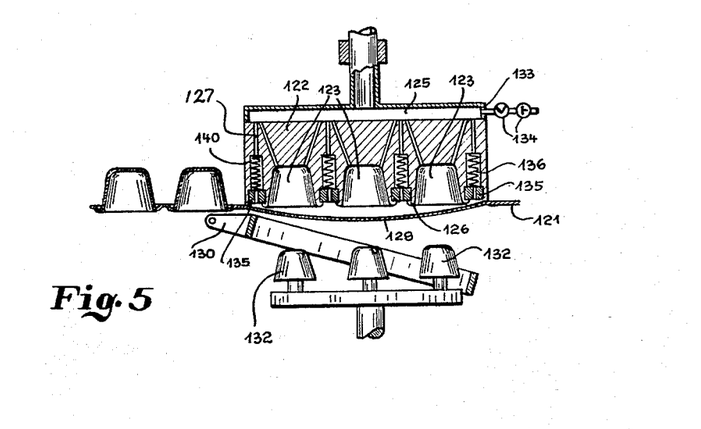
FIGURE 5 is a sectional elevation of a modified article shaping device.
Figure 6:
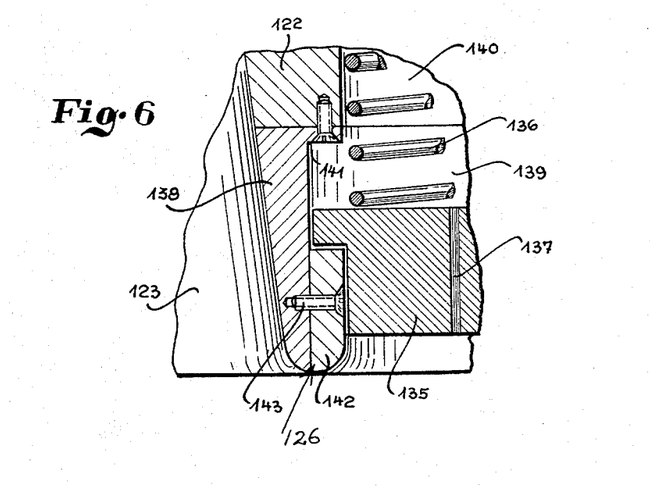
FIGURE 6 is an enlarged sectional elevation of a part of FIGURE 5.

A variant of the shaping device is illustrated in FIGURES 5 and 6. In the device illustrated in FIGURES 5 and 6, the heated and sagging plastic strip is acted upon not only by the clamping frame 130 but also by extenders 132 which are operative upwards. The extenders 132 are so moved as to advance, together with the sagging strip 121, into the said air cushion; the same therefore first tends to press the plastic strip against the surfaces of the extenders 132. The chamber 125 comprises an outlet 133 and valve means 134 to vary the air cushion effect and more particularly so to control the air cushion that none of the plastic strip 121 engages prematurely with the projections 126. An ejector plate 135 is mounted in the shaping tool 122 and, as can be seen more particularly in FIGURE 6, is mounted for movement vertically of the tool 122 and is depressed by springs 136. Consequently, when the tool 122 descends, the ejector plate 135 first engages with the external frame of the strip part 128 to be shaped, thus ensuring that the air cushion can be applied and formed gently. The springs 136 are stretched as the tool 122 continues to descend. After the clamping frame 130 has been pivoted into operation, the extenders 132 are advanced to a position in which the strip material is still just out of engagement with the mould projections 126, whereafter the chamber 125 is evacuated so that the strip material is drawn into the mould cavities 123. The strip material is engaged with the bottom of the ejector plate 135 through the agency of ducts 127 and 137.

The mounting of the plate 135 in the tool 122 can be seen in FIGURE 6. The edges of the mould cavities 123 is shaped to form a number of annular parts 138. Between the rings 138 substantially the entire undersurface of the tool 122 is recessed to form a chamber 139 from which bores 140 adapted to receive the springs 136 extend upwards. The ejector plate 135 is mounted in the chamber 139 for vertical displacement and is adapted in shape to the chamber 139. Upward movement of the plate 135 is limited by the base 141 of the chamber 139, and downward movement of the plate 135 is limited by stops 142. The same take the form of rings fitted externally to the bottom of the rings 138 and are secured, for instance, by means of screws 143. To ensure that a clean moulding surface is produced to prepare the untreated outer edge part 3 of the workpiece, the outer rings 142 are wider than the desired width of the outer edge 3, while the ejector plate 135 is recessed in the region of the outer rings 142 in order to engage thereover.

Figure 7:
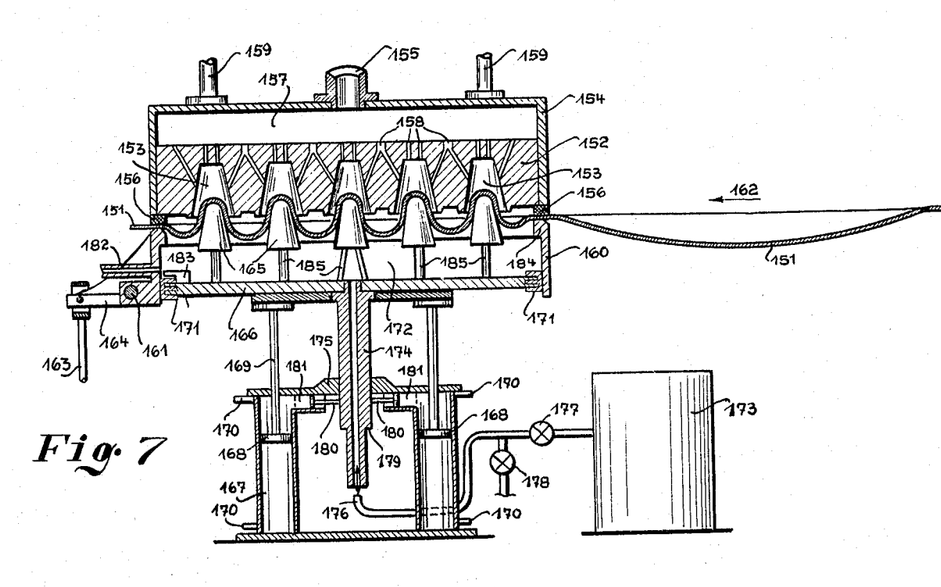
FIGURE 7 is a sectional elevation of another form of article shaping device.

Referring to the example illustrated in FIGURE 7, a shaping tool 152 is provided which is formed with mould cavities 153 and is a negative mould disposed above a strip 151 of material to be shaped. The tool 152 is disposed inside a casing 154 connected through a port 155 to a vacuum pump. Disposed below the casing 154 and tool 152 is a peripheral packing 156 which engages in sealing-tight manner with the strip 151 to be shaped and cooperates with the casing 154 and strip 151 to form a closed chamber adapted to be evacuated. Above the tool 152 the casing 154 is formed with an evacuable chamber 157 communicating through ducts 158 with the mould cavities 153. This entire shaping tool unit is vertically reciprocable and is moved, for instance, to a pneumatic or hydraulic device, the piston rods 159 of which are diagrammatically illustrated. A conventional clamping frame 160 is disposed below the shaping tool unit 152–159. The frame 160 can be adapted for substantially vertical movement in any desired conventional manner in order that it may be moved upwards and pressed against the strip 151 to be shaped, a vacuum-tight sealing of the strip 151 being provided by means of a peripheral packing 156 on the outer edge of the shaping tool 152. In the example illustrated the frame 160 is mounted for pivoting around a horizontal spindle 161 which can be placed, for instance, on the delivery side of the shaped workpiece as indicated by an arrow 162 denoting the direction of movement of the strip 151. The clamping frame 160 can be operated by a pneumatic or hydraulic device of which, for the sake of simplicity, only a piston rod 163 is indicated. The same engages with a lever arm 164 rigidly secured to the frame. Extenders 165 known per se are provided inside the frame 160; they are disposed on an extender support 166 and can be raised and lowered together therewith by a pneumatic or hydraulic actuator. In the embodiment illustrated pneumatic cylinders 167 having pistons 168 are provided, the extender support 166 being borne by piston rods 169. For actuation, the cylinders 167 are connected through connections 170 to a compressed air device.

The extender support 166 takes the form of an airtight plate which moves upwards into the interior of the frame 160. The plate 166 comprises on its outer edge a peripheral packing 171 which slides in sealing-tight manner on the inner surface of the frame 160. Consequently, when the extenders 165 move upwards, there is formed, below the strip 151 to be shaped, an enclosed chamber, the top of which is formed by the strip 151, the bottom by the plate-like extender support 166 and the side walls by the frame 160. This closed chamber 172 is relatively low, for the clamping frame 160 is, of course, narrow, and so the volume of the chamber 172 is reduced. This is very important for the invention, for only in such a chamber of such a reduced volume is it possible to produce a brief pulse of compressed air of the kind provided by the invention. Such pulse can be produced just by the rising of the support 166.

In the embodiment illustrated, the chamber 172 is also connected to an air compressor or to a compressed air reservoir 173. To this end, the support 166 comprises a hollow guide pin 174 which also cooperates with a slideway 175 to prevent the support 166 from tilting out of the horizontal plane, thus ensuring that the packing 171 is introduced reliably into the interior of the frame 160. Connected to the pin 174 is a flexible air pipe 176 which is connected through an automatic valve 177 to an air reservoir 173. An automatic outlet valve 178 is connected to the pipe 176.

To lock the airtight support 166 in its top position, to prevent the pulse of compressed air from being absorbed by the pneumatic cylinders 167 and thus being reduced, locking means are provided, in the form of a shoulder 179 with which the pin 174 is formed and over which a pneumatically operated bolt 180 engages. The pneumatic cylinders 181 for the bolt 180 can be independently operated automatically. Alternatively, and as shown in the example illustrated, the compressed air cylinders 181 of the bolt 180 can be connected directly to the compressed air cylinders 167 of the pneumatic raising device for the extenders 165, and the impact pressure produced in the top of the cylinders 167 when the extenders 165 rise can be used to press the bolt 180 against the guide pin 174 and to move it behind the shoulder 179. In such a case, however, the top of the cylinder 167 must be briefly subjected to a negative pressure to release the bolt 180, and this negative pressure event must be controlled automatically in the machine cycle.

Figure 13:
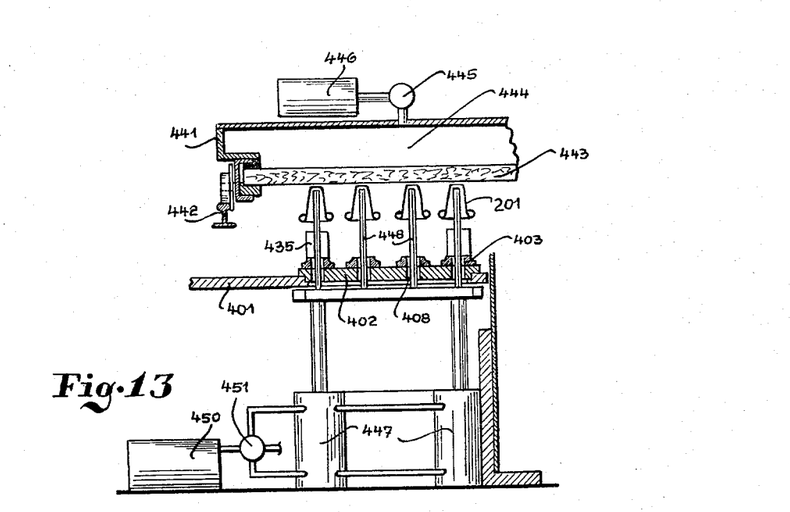
FIGURE 13 is a sectional elevation, on the line XIX—XIX of FIGURE 11.

The operation according to the invention is as follows: The strip 151 to be shaped, before reaching the vacuum shaping machine, is so heated, for instance, in the region where the arrow 162 is disposed in the drawing, as to sag after the fashion of a sack, as shown below the arrow 162. The lateral edges of the strip 151 are excluded from the heating so as to form a firm frame. The firm frame parts extending transversely of the strip 151 are formed by an unpreheated, i.e., firm, part of the strip 151 following the preheated part thereof on the right-hand side of FIGURE 13, while at the left-hand end of the sagging part of the strip 151 the packing 156 on the right-hand side of the machine in FIGURE 13 produces a transverse part between the shaped piece of the strip 151 and the following piece.

To push up the strip 151, the shaping unit 152–159 is in its top position, while the extenders 165 have been withdrawn downwards and the frame 160 has been pivoted down.

Once the sagging part of the strip 151 is below the shaping tool, the unit 152–159 is lowered and the frame 160 is pivoted upwards. The strip is therefore clamped between the top edge of the clamping frame 160 and the packing 156 so that the vacuum shaping tool is sealed satisfactorily. Thereafter the extenders 165 are raised in the manner described in the parent patent. As the extenders rise, the airtight extender support 166 engages by its packing 171 in the interior of the frame 160. However, there is initially no increase in the air pressure in the chamber 172 thus formed, since air can escape through at least one lateral exit aperture 182 in the frame 160. Once the packing 171 has covered the aperture 182, the air pressure in the chamber 172 can increase pulsewise. In the example illustrated, however, such an increase is prevented because the outlet valve 178 is open. The extenders 165 therefore rise to their top position without any additional supply of compressed air. The bolts 180 engage below the shouldered part 179 of the guide pin 174 in the manner hereinbefore described once the extenders 165 are in the top position. The chamber 157 is then evacuated through the port 155 and the strip 151 starts to be sucked into the mould cavities 153.

In order that the treatment strip 151 may be given, during this vacuum shaping step, the pressing and extending treatment which has been started by the extenders but which the same cannot complete, the valve 178 is closed briefly after the beginning of suction and the valve 177 is opened briefly. The term "briefly" should be understood in this connection as meaning that the pulse of compressed air is produced when the strip 151 is lifted off the extenders 165 by the vacuum but has not yet engaged in the mould cavities 153. Immediately after the pulse of compressed air has been produced, the guide pin 174 is unlocked by the top of the cylinders 167 being subjected to a brief negative pressure, so that the descent of the extenders 165 is initiated. Also, the valve 178 is opened so that the compressed air can escape. In the meantime, however, the packing 171 has uncovered the aperture 182 in the clamping frame so that some of the compressed air also escapes through the aperture 182 and eddies are therefore produced inside the chamber 172, such eddies flowing along the underside of the strip in engagement with the shaping tool and cooling such strip. To limit the ascent of the extender plate 166, abutments 183 can be provided on the top and can engage with an annular bead 184 inside the frame 160.

Where the extenders 165 are formed with a blowing surface, the air pipes to the extenders can be disposed below the plate 166 and extend, near the extender rods 185, through the plate 166 into such rods.

Other embodiments of the invention are possible in addition to the example illustrated, the important thing being that a brief pulse of compressed air must always be provided. The compressed air pulse can be varied in timing near the end of the advance movement of the extenders and the beginning of the suction effect in the shaping tool, to suit actual requirements. This embodiment of the shaping device has the particular advantage that the edge parts of the workpieces to be shaped are pressed very reliably against the edge beads surrounding the mould cavities, and such edge parts or regions are prepared very satisfactorily for subsequent beading.

Figure 8:
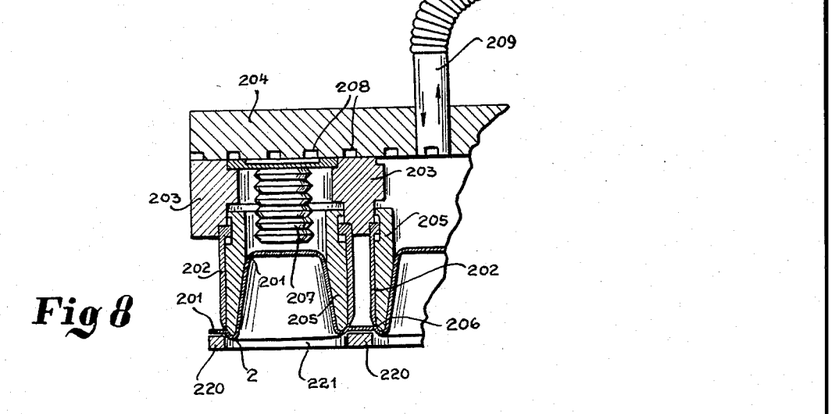
FIGURES 8 and 9 are sectional and rather diagrammatic elevations of two forms of a punching device.

The shaped strip 201 passes from the shaping device to a punching device, two basic embodiments of which are illustrated in FIGURES 8 and 9. In the embodiment illustrated in FIGURE 8, punching knives 202 are secured by retaining elements 203 on a vertically reciprocable carrier plate 204. Aligning and distributing sleeves 205 are mounted inside the sleeve-like knives 202 for vertical movement relatively thereto. The sleeves 205 have on their bottom edge annular aligning parts 206 which engage into the preshaped edge part 2 of the workpiece. Consequently, when the punching device descends the sleeves 205 first engage with the workpiece surface and the ring 206 enters the preshaped edge part 2. Only when this step has been completed does the sleeve 205 release the punching knife 202. This ensures that the edge part 3 is cut to shape accurately.

Figure 10:
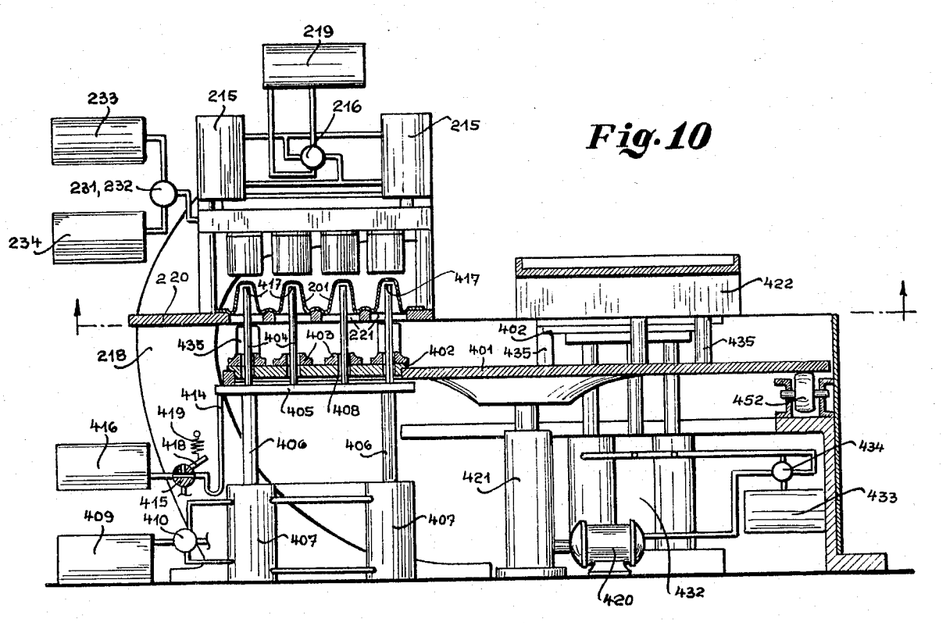
FIGURE 10 is an elevation, partly in section, of another form of punching or stamping device and a rim finishing device.
Figure 11:
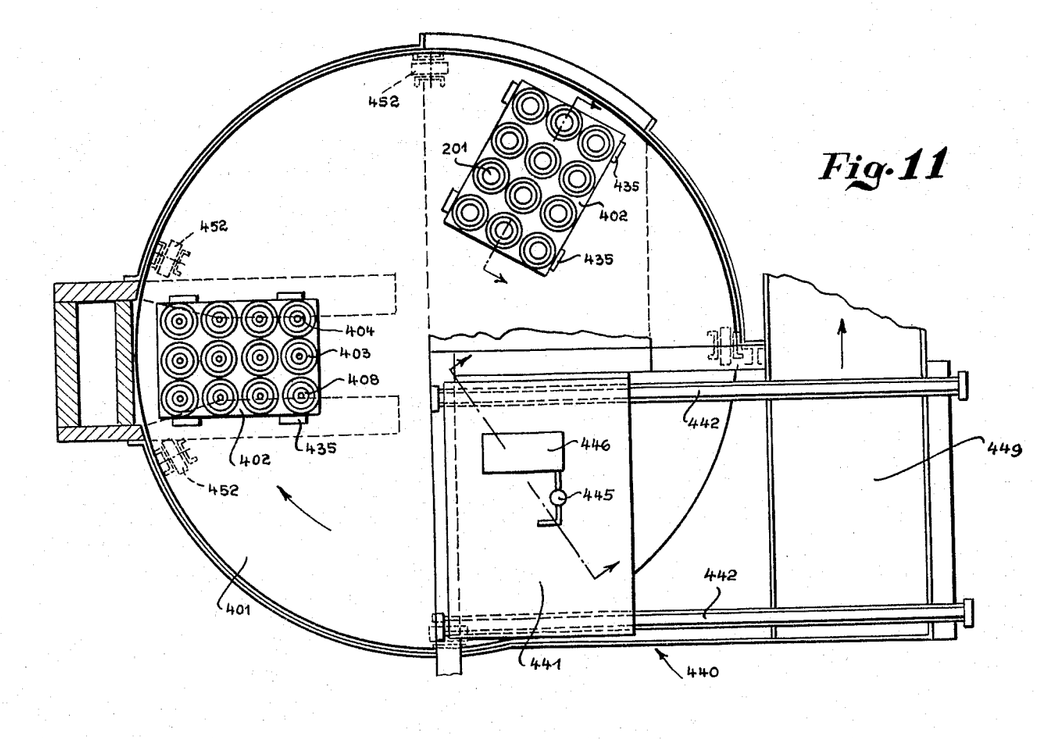
FIGURE 11 is a plan view, partly in section, on the line XVII—XVII of FIGURE 10.

To release the punched-out workpiece from the punching device, more particularly from the sleeve 205, ejector devices are provided which, in the embodiment illustrated, take the form of bellows 207; the same are connected through ducts 208, a pipe 209, a valve 231 and a valve 232 to a vacuum device 233 and a compressed air device 234 (see FIGURE 10). The bellows 207 are contracted before and during punching by being connected by the valve 231, 232 to the vacuum device 233. Upon the completion of punching the valve 231, 232 connects the bellows to the compressed air device 234, the bellows 207 are inflated and the workpieces are therefore pressed out of the sleeves 205. The punching base 220 is formed with apertures 221 for onward conveyance of the punched-out articles.

In the example shown in FIGURE 9, the punching device is of substantially the same construction as in FIGURE 8, except that the knives 210 themselves have an aligning and distributing surface 211 and comprise a ring 212 which enters the preshaped edge part 2. However, to ensure that the cutting edges of the knives 210 are released only when the surfaces 211 rest completely on the workpiece surface and the rings 212 have entered the preshaped edge parts, a safety plate 213 is provided which, when the punching device is in the bottom position, engages with the punching base 220 and the punched-out plastic strip 201 resting on such base. In the present case the ejector device 207, 209 is of similar design to that shown in the example of FIGURE 8. In both cases the punching device can be operated by means of hydraulic or compressed air cylinders 215 which are supplied through an automatic valve 216 from a device 219 operating either on pressure oil or on compressed air (see FIGURE 10).

FIGURES 10 to 13 illustrate an embodiment of the rim finishing device which is combined with its feed device and with a device for onward conveyance of the finish-treated workpieces, to form a single machine unit and which directly follows the punching device.

The workpieces 201 are conveyed by a rotating plate 401 on which, as can be seen more particularly in FIGURE 17, raisable plates 402 are disposed. The same bear on their tops trestles 403 on which the prepared and punched-out workpieces 201 are placed.

In order that the workpieces 201 which leave the punching device through the apertures 221 may be placed directly on the trestles 403, the plate 401 extends to below the punching base 220. The machine frame 218 of the punching device is therefore designed correspondingly for the plate 401 to extend through it.

Figure 16:
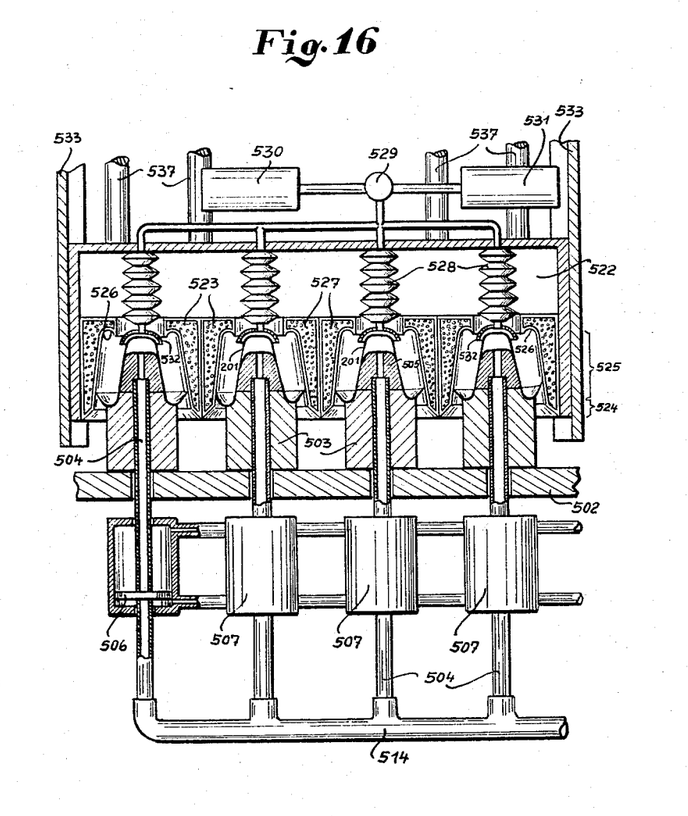
FIGURE 16 is a sectional elevation, on a larger scale, of part of FIGURE 14.

Sucking and guiding fingers 404 are provided to transfer the articles 201 reliably. The fingers 404 are disposed on a common frame 405 in the form of a tubular frame which is disposed on the piston rods 406 of a compressed air raising and lowering device 407. The fingers 404 can be lowered to below the bottom surface of the plate 401 by the device 407. Before punching starts, the fingers 404 are raised by the device 407 to their top position in which, as can be seen in FIGURE 16, they extend through apertures 408 in the plate 402 and in the trestles 403 and through the apertures 221 in the punching base 220 as far as, or to slightly below, the inner base surface of the workpieces 201. Upon the completion of punching the fingers 404 are lowered into their lowest position; as they descend, they take the workpieces 201 along with them and place them firmly on the trestles 403. The vertical movements are performed through the agency of a compressed air device 409 and of a valve 410 through which the compressed air device 409 is connected to the compressed air cylinders 407.

For firm retention of the articles 201 on the top apex of the fingers 404, the same are formed with lengthwise bores. The frame 405 is also formed with bores which are connected to a vacuum device 416 through a connecting member, a flexible tube 414 and a valve 415. To improve the engagement of the workpieces 201 on the points of the fingers 404, the finger points or apexes 417 comprise nozzle-like cups made of a resilient substance, such as rubber, so that the negative pressure can be fully operative on the base of the articles 201. By means of an operating arm 418 and spring 419 of the valve 415, the frame 405 of the fingers 404 so controls the valve 415 that the same closes automatically when the frame is in its bottom position.

With this method of transferring the articles 201 from the punching device to the plate 402, the trestles 403 must correspond in number and arrangement exactly to the punching device. When the same is replaced, an appropriate different plate 402 can readily be fitted.

The plate 401 is rotated stepwise by a motor 420 and a transmission 421. Each plate 402 with its trestles 403 is moved stepwise from the position below the punching device to a position below the stamping device 422. The same contains stamping moulds 423 (FIGURE 12) to the same number as there are trestles 403 on the plate 402. As can be seen in FIGURE 18, the stamping mould 423 can comprise an operative surface which is subdivided into an introductory zone 424, a deflecting and guiding zone 425 and a rounded shaping zone 426. Electric heating means 427 can be provided at least for the guiding zone 425 and for the shaping zone 426.

For reliable removal of the articles from the stamping tool after the stamping step, and to place the same on the trestles 403, bellows-like ejectors 428 can be provided above the stamping tools; such devices are connected through a valve 429 to a compressed air device 430 and to a vacuum device 431 in a manner similar to what has previously been described with reference to FIGURES 8 and 9.

In the example illustrated in FIGURES 10 to 13, the rim finishing device 422 is stationary and the plate 402 is raised and lowered by a pneumatic or hydraulic lever device 432 comprising a pressing device 433 and a control valve 434. The workpieces are introduced accurately into the stamping device 422 by means of guide elements 435.

The plates 402 move stepwise from the stamping device 422 to a transfer device 440 mainly comprising a carriage 441 movable on rails 442. The carriage 441 bears on its underside a porous plate 443 above which is a chamber 444. The same is connected through a control valve 445 to a vacuum device 446. Below the plate 401 and near the carriage 441 is a raising and lowering device 447 comprising guiding fingers 448 adapted to be raised by the device 447. As they rise, the fingers 448 extend through the bores 408 in the plate 402 and in the trestles 403, disengage the finished articles 201 therefrom, and raise the articles as far as the underside of the porous plate 443 where they are retained by suction. The fingers 448 are immediately lowered and the carriage 441 is moved away from the plate 401 over a conveyor belt 449. In this position the suction operative by way of the valve 445 is stopped and the finished articles drop onto the belt 449 by which they are conveyed, in a similar manner to that shown in FIGURES 5 and 7, to a packing station. The device 447 is controlled and operated similarly to the device 407 associated with the fingers 404. To this end, a pneumatic or hydraulic pressure device 450 and an automatic control valve 451 are provided.

Bearing rollers 452 can be provided to ensure that the plate 401 runs quietly and reliably.

Figure 14:
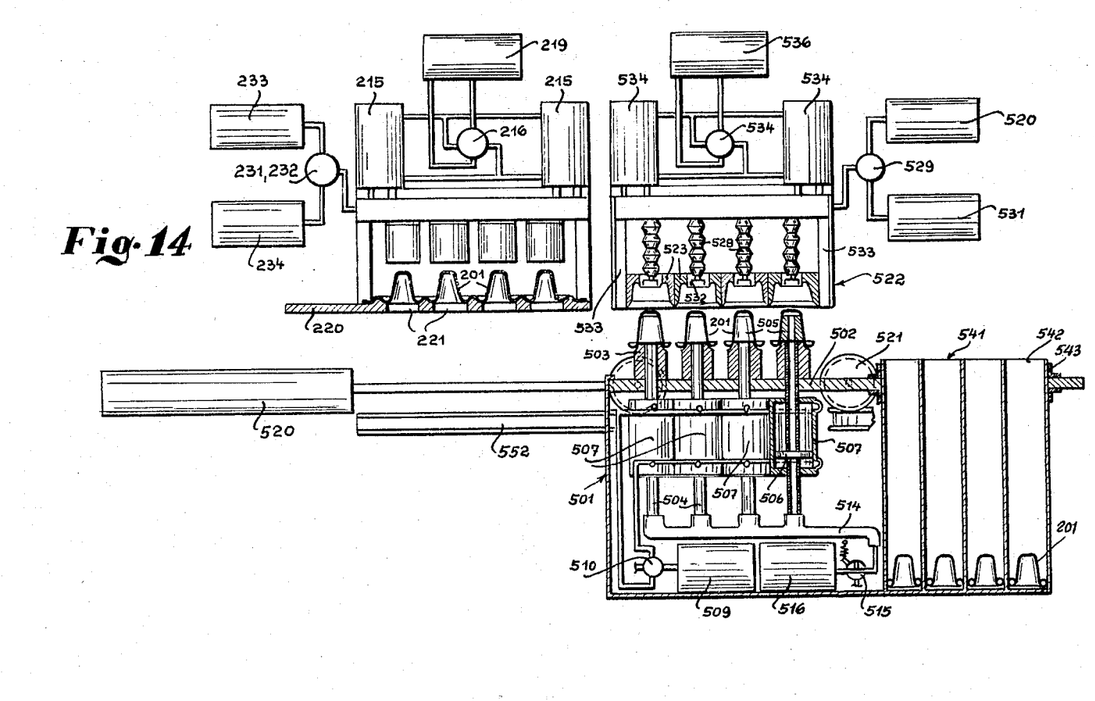
FIGURE 14 is an elevation, partly in section, of a further form of punching or stamping device and a further form of rim finishing device.
Figure 15:
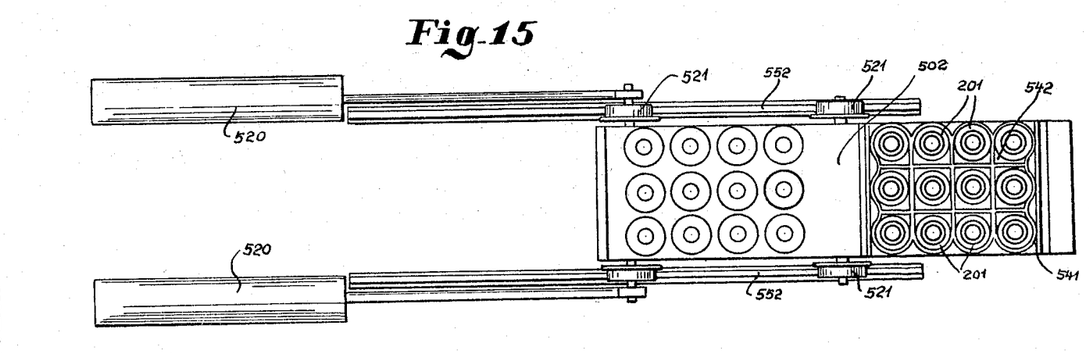
FIGURE 15 is a plan view of part of FIGURE 14.

In the embodiment illustrated in FIGURES 14 to 16, the further treatment device for the articles is a stamping device for beading over the stamped-out edges of the articles. The punching device of this embodiment can be of the same design as in the example shown in FIGURES 16 to 19, and so for the sake of clarity the machine frame of the punching device is not shown in FIGURES 20 and 21. As in the example illustrated in FIGURES 16 to 19, the punching tools are disposed above the punching base 220 and are mounted for vertical reciprocation. Such reciprocation is produced by hydraulic or pneumatic cylinders 215 supplied through a valve 216 from a hydraulic or pneumatic pressure device 219. The ejector devices associated with the punching tools can be of the same design as in the example shown in FIGURES 14 to 19 and can be operated by the same vacuum and compressed air devices 233, 234 through the control valves 231, 232. The base 220 is formed with apertures 221 through which the punched-out workpieces 201 can drop.

In this example the space below the base 220 is kept free and can be entered by the carriage 501, the same moving into a left-hand end position as shown in FIGURES 14 and 15, in which position the trestles 503 on the carrier plate 502 are immediately below the apertures 221 in the base 220. To enable it to perform this lateral reciprocation, the carriage 501 runs on wheels 521 which run on lateral rails 552. The carriage 501 is reciprocated by one or by a pair of hydraulic or pneumatic cylinders 520 diagrammatically illustrated in FIGURES 20 and 21 and controlled in a manner to be described hereinafter. In addition to its carrier plate 502 with the trestles 503, the carriage 501 also comprises transfer fingers 504 which, as in the example illustrated in FIGURES 10 to 13, are mounted for vertical displacement in vertical central bores in the trestles 503. In contrast to the example illustrated in FIGURES 16 to 19, however, the fingers 504 always remain in the bores in the trestles 503 and are therefore reciprocated together with the carriage 501. The advantage of this is that the fingers 504 give the articles 201 extra protection against dropping off their trestles when the carriage 501 is reciprocated. The fingers 504 therefore comprise at the top caps 505 which are adapted to the inner shape of the workpieces 201 and which can be produced, for instance, from a foamed plastic and which engage in sealing-tight manner with the inside of the articles 201, thus improving the negative pressure applied by the vacuum device 516 through the hollow fingers 504 and the connecting tube 514 and the control valve 515. The operation of the valve 515 will be described in greater detail hereinafter.

For vertical reciprocation of the fingers 504, each such finger comprises a preferably pneumatic cylinder 507. In the example illustrated the fingers 504 extend vertically through the cylinders 507, and their bottom ends which project out of the cylinders 507 are connected to a vacuum pipe 514. In the centre each finger 504 bears a piston plate 506 which can be supplied to the cylinder 507 from two sides. The cylinders 507 are connected to a compressed air device 509 through a change-over valve 510.

The stamping tool 523, 522 is of similar design to that shown in FIGURES 10 to 13 but is suspended in a similar machine frame as that of the punching device for vertical reciprocation. The range of movement of the carriage 501 is such that the right-hand end position of the carriage 501 in the drawings corresponds to a position in which the trestles 503 are correctly positioned below the stamping device 522.

As can be seen in FIGURE 16, the stamping device 522 is of fundamentally the same design as in the example shown in FIGURES 10 to 13 and has, as in such example, a plurality of stamping moulds which are formed with a very conical introductory zone 524, a slightly conical deflecting and guiding zone 525 and a rounded shaping zone 526. As in the case shown in FIGURE 18, the stamping moulds comprise electrical resistance heating means 527 which heat the mould surface at least near the operative zones 524, 526.

Figure 12:
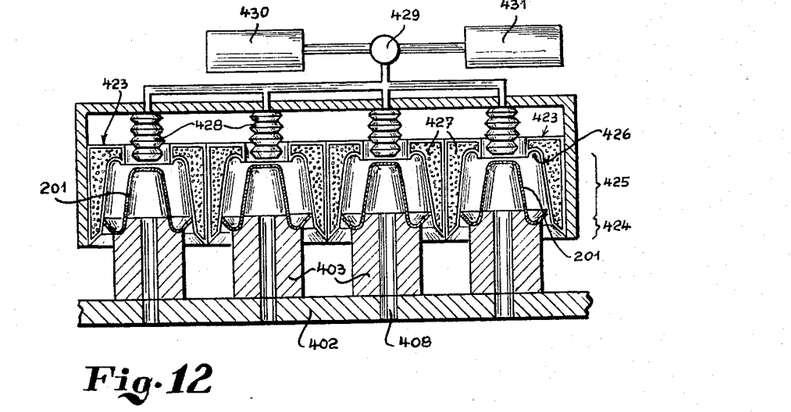
FIGURE 12 is an enlarged sectional elevation, on the line XVIII—XVIII of FIGURE 11.

As in the case shown in FIGURE 12, similarly, in the example shown in FIGURE 16, the stamping device comprises bellows-like ejector elements 528 which extend downwards into each stamping mould. The elements 528 comprise at their lower ends in this example additional suction cups 532, the underside of which communicates through suction nozzles with the interior of the elements 528. The same communicate through a control valve 529 with a compressed air device 530 and with a vacuum device 531 in a manner similar to that shown in FIGURE 18.

In addition to what is done in the embodiment illustrated in FIGURE 12, in the present case the stamping device 522 is mounted for vertical reciprocation in the machine frame on diagrammatically illustrated guide elements 533. The device 522 is vertically reciprocated, in a manner similar to that in which the punching tools are vertically reciprocated, by means of hydraulic or pneumatic cylinders 534 which are connected through a change-over valve 535 to a hydraulic or pneumatic pressure device 536. Just as in the case of the punching device, the arrangement is such that the device 522 is suspended on the piston rods 537 of the hydraulic or pneumatic cylinders 534.

The device 541 which receives and conveys onwards the finished articles is, in the present case, in direct succession to the carrier plate 502 of the carriage 501 and mainly comprises a light wire basket comprising vertical article-receiving ducts 542 adapted in arrangement and number to the punching device and to the stamping tool 522.

The basket 541 is so fitted that the ducts 542 are at such a distance from the trestles 503 that, when the carriage 501 is in the position in which the trestles 503 are below the apertures 221 in the base 220, the ducts 542 are positioned exactly below the stamping moulds. The basket 541 is just suspended in a frame 543 on the plate 502 and can be replaced, when it has been filled up with finished articles, while the machine is in operation.

The embodiment illustrated in FIGURES 14 to 16 operates as follows:

When the carriage 501 is in its left-hand end position (not shown), the punch-operating valve 216 is so operated that the cylinders 215 press the punching tool down to cut articles 201 out of the strip of material. Also, the fingers 504 are raised by the control valve 510 being so adjusted that the piston plates 506 are actuated from below by hydraulic or preferably pneumatic pressure. The workpieces 201 which have just been punched out of the strip of material are therefore picked up by the fingers 504. Upon the completion of punching—i.e., when the punching tools have reached their lowest position—the valves 510, 216 are changed over, with the result that the cylinders 215 raise the punching tools, while the cylinders 507 lower the fingers 504 until the same engage by their underside with the caps 505 on the trestles 503 so that the workpieces 201 rest by their edges on the trestles 503. The valve 515 is operated simultaneously with the valve 510 in such a way that, during the ascent and descent, air is sucked through the hollow fingers 504, with the result that the articles 201 are picked up reliably and transferred reliably to the trestles 503. When the fingers 504 are in their lowest position, the valve 515 is operated again to cut the vacuum device 516 off from the flexible pipe 514. Upon the completion of these steps, the carriage is moved by its operating cylinders 520 into its right-hand end position which is shown in the drawings. Once the carriage 501 has reached such position, the valve 535 is so changed over as to operate the cylinders 534 which lower the stamping device 522. During this descent of the device 522, the valve 529 is so changed over as to connect the bellows-like ejector elements 528 and their suction cups 532 to the vacuum device 531. FIGURE 16 illustrates the stamping device precisely at the moment when the valve 529 is being changed over. The bases of the workpieces 201 have moved into the operative area of the suction cup 532, so that the workpiece wall is protected against being strained during stamping by the cups 532 and by the bellows 528 which are contracted by suction. Once the stamping device 522 has reached its lowest position and stamping has terminated, the valve 535 is changed over so that the cylinders 534 raise the stamping device 522. Since the valve 529 remains in position, the finished articles are lifted off the trestles 503 by the suction cups 532 and retained inside the stamping tool.

When the ascent of the stamping device 522 has terminated, the control for the shifting cylinders 520 is changed over so that the carriage 501 is returned to its left-hand end position. The trestles 503 and fingers 504 are then ready to repeat the process and to receive a further group of articles 201. However, before the occurs the valve 529 is changed over, the interior of the bellows-like ejector elements 528 thus being connected to the compressed air device 530. The bellows therefore widen downwards and the negative pressure operative in the cups 532 is cancelled, so that the finished articles drop into the ducts 542 of the basket 541. They are stacked one above another. When a desired number of such operations has been performed, i.e., a desired number of articles 201 have accumulated in each duct 542, the basket 541 can be replaced by an empty basket.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method for producing a beaded, hollow rim on a hollow, thin-walled thermoplastic article having a main wall terminating in an open mouth, said method comprising the steps of first forming an outwardly flared skirt around the rim of said mouth, and thereafter forming said skirt into a ring-like rounded hollow bead by first applying pressure and heat to said outwardly flared skirt progressively from the outer marginal edge thereof toward said rim to cause said skirt to fold progressively inwardly toward said main wall of said article, thereafter continuing to apply heat and pressure to the marginal edge portion of said skirt to cause said marginal edge portion to fold further inwardly and to curl toward the underside of said rim to form said ring-like rounded, hollow beaded rim, and simultaneously with the application of heat and pressure to said marginal edge portion of said skirt, applying an opposing pressure to the folded marginal edge portion adjacent the junction between said main wall and said skirt.

2. The method defined in claim 1, wherein the heat and pressure applied to inwardly fold said skirt and to curl said skirt are applied respectively at zones following each other.

3. The method defined in claim 1 wherein said bead is shaped between two surfaces, the effective distance between which progressively diminishes in a direction perpendicularly extending away from the plane containing the rim of said article.

4. The method defined in claim 1 wherein said main wall of said article is maintained free of the pressure applied on said skirt.

5. A process for producing a thin-walled, hollow thermo-plastic article having a beaded, hollow rim of rounded contour encircling a longitudinal axis comprising the steps of shaping said article from a sheet of thermoplastic material to provide a rim portion having a rounded contour encircling said axis and a substantially unbeaded, flared skirt extending outwardly and backwardly from said rim portion, said article being shaped by applying a vacuum to draw a portion of said sheet of thermo-plastic material into a shaping cavity, applying a stretching force to said thermo-plastic material to direct it into said cavity, and applying pulses of compressed air to said thermo-plastic material to assist in directing it into said cavity, cutting the thusly shaped article out of said sheet to leave at least a portion of said skirt extending from said rim portion, progressively backwardly bending said skirt of the thusly cut-out article by engaging said skirt with a first heated die ring surface beginning at the free marginal portions of said skirt and progressing inwardly toward said rim portion until said skirt is approximately parallel with said longitudinal axis, and thereafter curling said skirt towards the underside of said rim portion by so engaging the free marginal portions thereof with a second, curved, heated die ring surface as to produce a smooth finished bead of rounded, hollow contour on the rim of said article.

6. The process according to claim 5 wherein the pulses are started shortly before the vacuum is applied to draw said sheet into said cavity.

7. The process according to claim 5 wherein the pulses are started shortly after the vacuum is applied to draw said sheet of thermo-plastic material into said cavity.

8. A method for producing a thin-walled plastic article having a hollow, beaded rim of substantially circular cross-section comprising the steps of forming the body of said article by applying a vacuum to a sheet of thermoplastic material to draw a portion thereof into a shaping cavity, stretching the thermo-plastic material before said vacuum is applied and during the initial period when said vacuum is applied, applying brief pulses of compressed air to the side of the material facing away from said cavity to urge the thermo-plastic material towards said cavity, maintaining said vacuum to keep said material in engagement with the cavity surfaces until the thermo-plastic material has cooled and set, during the forming of said body, preparing the edge of said article to provide an outwardly flared skirt portion and a rounded, bent-over rim portion extending between and joining the skirt portion to said body, cutting the thusly formed, partially finished article from said sheet of thermoplastic material to leave at least a portion of said skirt portion extending from said rim portion, placing the thusly partially finished article with the bent-over rim portion onto a thrust surface to provide an abutment for beading over the still untreated but cut-to-shape skirt portion, bending said skirt portion backwardly by engaging the free marginal portions of said skirt portion with a first heated die ring surface and progressing inwardly toward said rim portion until said skirt portion extends at least substantially perpendicularly with respect to a plane determined by said rim portion, and thereafter curling said skirt portion by engaging the free marginal portions thereof with a second curved, heated die ring surface to produce a smooth, finished bead of rounded contour on the rim of the article.

9. The method defined in claim 8 wherein said pulses of compressed air are applied to said thermoplastic material before said vacuum is applied thereto.

10. The method defined in claim 8 wherein said pulses of compressed air are applied slightly after said vacuum is applied to said thermoplastic.

11. The method defined in claim 8 wherein eddying flows are produced in the compressed air by the shaped thermo-plastic material after said pulses are applied thereto.

12. A method of finishing a thin-walled, hollow thermo-plastic article at its rim portion to provide a hollow beaded rim of rounded ring-like contour, said article having a main wall terminating an open mouth and an outwardly flared skirt around the rim of said mouth, said method comprising the steps of first applying pressure and heat to said outwardly flared skirt progressively from the outer marginal edge thereof toward said rim to cause said skirt to fold progressively inwardly toward said main wall of said article, thereafter continuing to apply heat and pressure to the marginal edge portion of said skirt to cause said marginal edge portion to fold further inwardly and to curl toward the underside of said rim to form said ring-like rounded, hollow beaded rim, and simultaneously with the application of heat and pressure to said marginal edge portion of said skirt, applying an opposing pressure to the folded marginal edge portion adjacent the junction between said main wall and said skirt.

13. The method defined in claim 12 wherein the step of curling said skirt portion immediately follows the step of bending said skirt portion rearwardly while uninterrupted axial movement is imparted to move said first and second die ring surfaces relative to the article being finished.

References Cited by the Examiner
UNITED STATES PATENTS

| | | | |
|---|---|---|---|
| 209,686 | 5/1878 | House | 264—323 |
| 488,633 | 12/1892 | Paddock | 153—48 |
| 1,082,836 | 12/1913 | Whitney | 93—39.3 |
| 1,880,858 | 10/1932 | Davis. | |
| 2,259,508 | 10/1941 | Abramson. | |
| 2,425,390 | 8/1947 | Palmer et al. | 264—295 X |
| 2,541,905 | 2/1951 | Amberg. | |
| 2,891,280 | 6/1959 | Politis. | |
| 3,096,546 | 7/1963 | Edwards | 264—320 X |
| 3,115,677 | 12/1963 | Thiel | 264—292 X |

FOREIGN PATENTS 645,688  11/1950  Great Britain.

ROBERT F. WHITE, *Primary Examiner.*

M. R. DOWLING, *Assistant Examiner.*